United States Patent [19]

Andersson

[11] Patent Number: 5,413,745
[45] Date of Patent: May 9, 1995

[54] METHOD AND APPARATUS FOR PRODUCING AN ELONGATED BEAM

[76] Inventor: Curt Andersson, Torsbovägen 13, 641 96 Katrineholm, Sweden

[21] Appl. No.: 915,591

[22] Filed: Jul. 21, 1992

[30] Foreign Application Priority Data

Nov. 21, 1989 [SE] Sweden .................. 8903907

[51] Int. Cl.⁶ .................. B29C 47/38; B29C 47/08
[52] U.S. Cl. .................. 264/68; 264/119; 264/323; 425/325; 425/377
[58] Field of Search .................. 264/109, 119, 120, 68, 264/323; 425/207, 208, 377, 325

[56] References Cited

U.S. PATENT DOCUMENTS

| | | | |
|---|---|---|---|
| 3,790,326 | 2/1974 | Larsen | 425/325 |
| 3,860,220 | 1/1975 | Matsubayashi et al. | |
| 3,908,902 | 9/1975 | Collins et al. | 264/109 |
| 4,113,411 | 9/1978 | Terragni | 425/325 |
| 4,134,714 | 1/1979 | Driskill | 425/113 |
| 4,138,534 | 2/1979 | Tedesco | 264/45.3 |
| 4,358,418 | 11/1982 | Heggenstaller | 264/108 |
| 4,361,530 | 11/1982 | Peer | 264/120 |
| 4,410,474 | 10/1983 | Ahrweiler | 425/371 |
| 4,415,517 | 11/1983 | Timms | 264/119 |
| 4,645,631 | 2/1987 | Hegenstaller et al. | 425/325 |
| 5,028,466 | 7/1991 | Trotignon | 264/40.7 |
| 5,185,115 | 2/1993 | Thole | 264/113 |

FOREIGN PATENT DOCUMENTS

| | | |
|---|---|---|
| 1778230 | 1/1972 | Germany . |
| 2304088 | 8/1973 | Germany . |
| 484544 | 5/1938 | United Kingdom . |

OTHER PUBLICATIONS

WO91/07270, May 1991.

*Primary Examiner*—Allan R. Kuhns
*Attorney, Agent, or Firm*—Burns, Doane, Swecker & Mathis

[57] ABSTRACT

A method and apparatus for producing an elongated beam from compressible material. A mixture of filling material and plastic material is delivered to a first space and there compressed. The compressed material is pressed through a nozzle into a second space defined by a matrix of wall parts, where the material is made more rigid. The wall parts of the matrix can be moved backwards and forwards in a particular sequence to enable beam parts to be fed continuously through the matrix.

21 Claims, 1 Drawing Sheet

METHOD AND APPARATUS FOR PRODUCING AN ELONGATED BEAM

This application is a Continuation of PCT/SE90/00748, filed Nov. 19, 1990, published 30 May 1991, which designated the United States of America.

TECHNICAL FIELD

The present invention relates primarily to a method for producing an elongated beam, and more specifically to a method of producing an elongated beam continuously from compressible and compressed starting material.

The invention also relates to an arrangement for producing a beam continuously from a compressible starting material.

The compressible material used when practising the invention comprises a filling material admixed with a plastic material.

The invention is applied to particular advantage when the compressible starting material comprises a mixture of disintegrated (preferably clipped) filling material and a disintegrated (preferably clipped) plastic material, both in the form of surplus and waste materials.

BACKGROUND PRIOR ART

Different methods and arrangements for producing elongated beams are known to the art, these methods and arrangements having been adapted to the material from which the beam is composed.

An example of the present state of the art in this respect is found in the plant machinery illustrated and described in International Patent Application PCT/SE84/00303. This publication illustrates and describes an arrangement for producing an elongated member (a beam), in which a compression arrangement incorporated in a compression section is intended to displace and to compress separate batches of chip fibre which are moistened with binder and clearly defined by weighing, these compressed, separate material batches being intended to pass, in sequence, through a high-frequency heating section.

The subject matter of Swedish Patent Specification 415 547 (Swedish Patent Application 7809708-4) also belongs to the prior state of the art. This specification teaches a heating section arrangement in which the wall parts of said section can move reciprocatingly in a horizontal direction and function in part as means for transporting compressed, chip-fibre batches.

In each of these known embodiments, the beam is produced from separate, well defined material batches which are mutually separated by a boundary section or interface section of varying degrees of compression and also, to some extent, fibre directions which are displaced relative to one another in the vertical plane, and wherein the requisite curing of the batches is effected in a heating section.

The contents of the respective following publications also forms part of the known prior art with respect to the principles of the present invention.

It is known from publication FR-1 589 723 to use in extrusion processes a screw conveyor which has a decreasing pitch.

Publication DE-A-2 304 088 teaches a method of controlling the rotational speed of an extruder screw.

Publication GB-A 484 544 teaches a method in which there is used a starting material which comprises disintegrated cork admixed with a binder and used to produce a continuous elongated member or beam. Part of an elongated extrusion passage is displaced axially at the same speed as the material during a part of the compression movement, so as to reduce friction.

This publication teaches an application in which the material mixture is pressed by means of a plunger or piston through a passage of rectangular cross-section, where the upper and the lower wall surfaces are stationary whereas the side surfaces are movable and extend beyond the upper wall. The movable surfaces or walls are connected to the piston via clearance-defining means. This means has the form of a projection provided on the piston and coacting with a groove in the walls. The size of this clearance can be adjusted with the aid of an adjusting screw.

The material mixture is fed from a feed hopper into a compression space and is there compressed initially by the starting movement of the piston, with the side walls stationary, whereafter the compressed part of the material mixture and the two side walls are moved together during terminal movement of the piston.

When the piston is withdrawn, the side walls remain stationary until the piston carries out its terminal movement.

Similar to the invention, it is also known to use granulated waste plastic, waste paper, waste metal foil and the like for producing extruded profiled sections. Reference is made in this respect to publication SE-B-410 946, which makes reference to a polyolefin plastic proportion of 60–80% and the remainder paper or board, and optionally also up to 5% by weight metal.

Publication DE-B-1 778 230 describes the possibility of producing profiled bodies by producing a mixture of granulated waste plastic and paper, shaping the mixture, and incorporating 20% paper waste as a filling agent.

For the sake of completeness it can also mentioned that a large number of machines for compressing granulated material to briquette form are known to the art.

The International Patent Application PCT/SE89/00652 also teaches a method and apparatus for constructing a beam or elongated member from a mixture of plastic material and a filler material, such as wood fibres, textile fibres and the like, by subjecting the mixture to compression while the plastic material portion of the mixture is tacky or in a molten state.

DISCLOSURE OF THE INVENTION

Technical Problems

A study of the aforedescribed earlier standpoint of techniques will show that a primary technical problem is one of providing a method and apparatus by means of which an elongated element can be produced continuously in a simple and inexpensive manner, without needing to use mutually separate material batches and to compress these batches, where the material is warm and comprises a compressible material, such as an admixture of filler and plastic material, by using an earlier known briquette-manufacturing machine and connecting to this machine a movable wall matrix with which movement of the walls is adapted so as to enable an extruded beam (or a tube) to be fed through the matrix at the same speed as the beam is fed from the machine nozzle.

Another technical problem is one of enabling movement of the beam through the matrix to be readily adjusted, for instance so that a small tension force will occur in the continuously produced beam section located between the nozzle and the matrix.

It will also be seen that another technical problem is one of realizing that the requisite continuous feed movement of a beam section located in a matrix comprising a plurality of reciprocatingly movable wall parts can be achieved when the movement pattern of the individual wall parts are mutually coordinated in a particular manner.

It will also be understood that a technical problem is one of realizing the advantages that are afforded when, in the case of a machine of the aforesaid kind, it is possible to adapt the temperature of the material at the input to the compression section, optionally by supplying heat from an external source, and utilizing the thermal energy generated by compression to soften and/or melt the plastic material present, at least at the end of the compression section, so that a briquette length or beam produced continuously by the machine will obtain a solid doughy consistency which will enable the beam to be fed into a matrix provided with movable wall parts and there solidify.

It will also be seen that a technical problem resides in the provision of a simple matrix configuration which will surround the briquette length or beam section subsequent to its manufacture in the machine, and that the friction acting between the matrix and the beam material can be adapted with the aid of extremely simple measures, by moving one or more matrix walls backwards and forwards in a movement pattern such that the outer surfaces of the beam are worked during continuous movement of the beam through the matrix.

Another technical problem with respect to working of the briquette length or beam section by the movable wall parts in the matrix is one of realizing the advantages that are afforded when the beam section is pressed against an anvil surface or counter-pressure surface by movement of the walls, so that the relative movement between wall parts and beam section will be relatively small.

Another technical problem is one of providing conditions, with the aid of simple means, which will enable a small, terminal compression of the beam section to be effected within the matrix, and then within a section of the matrix nearest the nozzle.

It will also be seen that a technical problem resides in the provision of a simple matrix configuration and a simple extension of the screw conveyor of the machine, such that the beam will have a circular or square cross-section, or some other suitable outer and/or inner cross-section.

Yet another technical problem is one of realizing the possibility of using waste material as a starting material, in which the proportion of plastic material is significant and therewith to realize that the plastic material and filler material should be present in suitable proportions, particularly when the filler material is a finely divided fibre material, such as wood fibre material, in order to obtain a durable beam with the aid of a briquetting machine.

Another technical problem is one of realizing that the heat contained in the wood fibre material as a result of the preceding, requisite heat drying of said material, such as wood chips (saw dust, cutter chips), can be utilized by mixing the wood chips with plastic material immediately after the heat treatment process and, when necessary, further heating the mixture so that the plastic material will obtain a tacky and/or liquid state, prior to compressing the material and subsequently cooling the same to form said beam.

SOLUTION

The invention relates primarily to a method of producing continuously an elongated beam from a compressible and compressed material mixture.

The compressible material used in accordance with the present invention comprises a mixture of filler material and plastic material, preferably with the plastic material proportion being in a molten state, this mixture being delivered to a first space and there subjected to compression. The compressed material is urged continuously, by a briquette machine, through a nozzle into a second space, defined by a matrix having movable wall parts.

In accordance with the present invention, the compressed material present in said second, matrix-like space is moved continuously in a direction away from the first space, or nozzle, this movement being adapted to the continuous feeding speed of the material from the nozzle, despite the wall parts being reciprocatingly movable.

As preferred embodiments lying within the scope of the inventive concept, it is proposed that a plurality of wall parts (two or more, although not all) of the matrix are moved in common in the direction of material movement through the matrix during each interval.

It is also proposed that the thermal energy generated by the compression of the filler/plastic mixture is adapted so that the mixture will be heated to a temperature sufficient to soften and/or melt the plastic material present.

This can be achieved with the aid of a variable-speed screw-conveyor and/or a screw conveyor with which the screw pitch decreases in a direction towards the second space, so as thereby to obtain desired compression within the screw conveyor.

It also proposed in accordance with the invention that the material is subjected to precompression with the aid of another screw conveyor, although preferably at different rotational speeds. In this case, the second screw conveyor is preferably rotated more quickly than the first conveyor.

According to one particularly advantageous embodiment, the reciprocatingly movable wall parts enclose the beam section or briquette length in the form of a matrix, and that respective wall parts are moved slowly forwards (at a speed corresponding to or slightly exceeding the continuous feeding speed of the beam section), and are moved rapidly back, and that the movement pattern of a wall part is coordinated with the movement pattern of remaining wall parts, so that the beam will be advanced continuously through the matrix, preferably while cooling.

For the purpose of obtaining a rigid beam, it is proposed that the plastic material is mixed with a filling material in proportions such that the plastic material is present in quantities between 20 and 60%, preferably between 30–50%, normally about 40% of the total material content.

The filling material will preferably comprise newly dried and heated fibre material, whereas the plastic material will comprise waste plastic, plastic garbage or like inexpensive plastic material.

The invention also provides an arrangement for producing continuously a beam or an elongated member, comprising a compression arrangement provided with a rotatable shaft, and a matrix located adjacent said compression arrangement, said compression arrangement functioning to press the material through the matrix in accordance with the principles of briquette manufacturing techniques.

The matrix sections are arranged so as to surround the briquette length and one or more of such sections or wall parts are reciprocatingly movable in a determined movement pattern in relation to remaining wall parts.

ADVANTAGES

Those advantages primarily associated with the inventive method and arrangement reside in the provision of conditions whereby a material mixture which comprises a filling material and a plastic material, preferably in liquid state and with the plastic material being present in a smaller proportion than the filler material and/or a reinforcing material, such as glass fibre material, admixed with the plastic material, can be passed from a first space in a machine for producing briquettes to an adjoining second space, a matrix, which spaces are sequentially arranged, and with the aid of movable matrix sections or wall parts to produce continuously a beam from inexpensive starting material and with adapted friction against the wall parts.

Such a beam or elongated member can be used as a nailing battens, door frames, window frames or the like, or can be cut into given lengths to form pallet blocks.

BRIEF DESCRIPTION OF THE DRAWINGS

An embodiment of an arrangement adapted for producing continuously a beam or elongated member from a compressible and compressed material mixture at present preferred will now be described with reference to the accompanying drawing, in which.

DESCRIPTION OF EMBODIMENTS AT PRESENT PREFERRED

Figure 1:
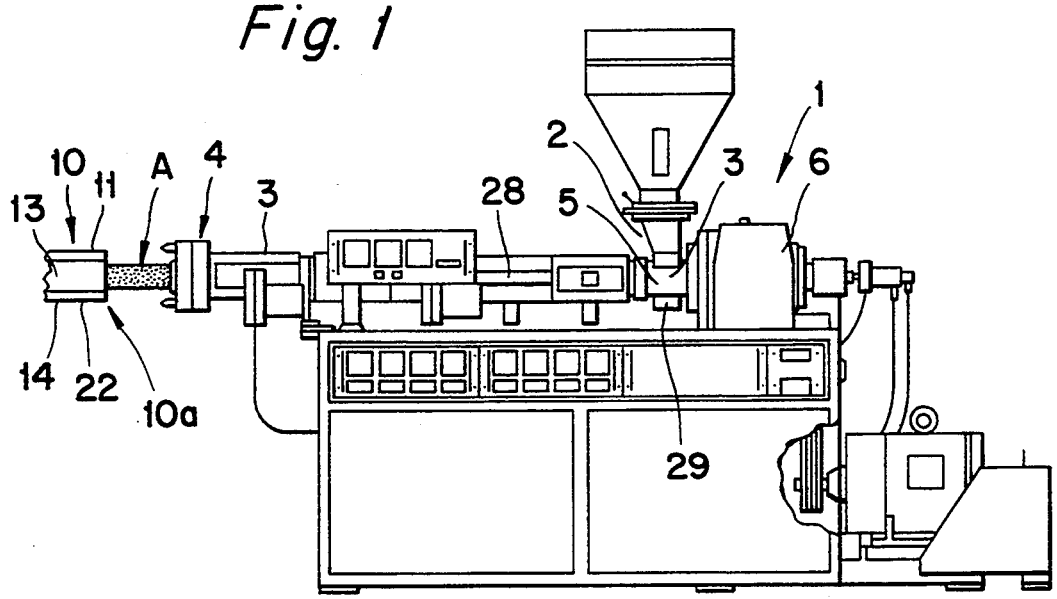
FIG. 1 is a side view of a machine comprising a compression section in the form of a briquetting machine.

In FIG. 1 the reference numeral 1 identifies a known machine for mixing plastic material with a filling material and/or a reinforcing material.

The machine 1 will preferably be capable of heating the plastic material, preferably to a temperature which lies only slightly above the temperature at which the plastic material becomes liquid, but at a temperature at which the plastic material becomes tacky.

In the illustrated case, dipped or shredded paper is used as filling material and a plastic material which is liquidized or almost liquidized by heating. The proportion of plastic material used should be less than 50%, but preferably about 10%. A normal proportion will lie between 20 and 50%, say about 40%.

A plastic material such as polyethylene may be present in a proportion of 25–40% when the filling material used is paper.

Furthermore, the machine 1 includes a precompressing device in the form of a screw feeder, such that a mixture of plastic material and filling material is delivered through a tube 2 under pressure to a space 3. This space 3 can be said to be defined by an internal, rotatable core and an external sleeve 5.

The material is gradually compressed in the space 3, said material substantially exhibiting the pressure imparted thereto as it passes through the tube 2. The material is compressed to a much greater extent in a region 3' located downstream of the space 3. The plastic material present in the mixture obtains a liquid or tacky state within this region 3'.

As the material passes through the machine to the left in FIG. 1, the temperature of the material increases such that the plastic material is softened and such that in the region 3' the plastic material and filling material will be thoroughly mixed together with all of the plastic material present being substantially in a liquid state. The material finally compressed in the machine 1 is fed continuously from the end of a first space 3' through a nozzle 4 and there exists in briquette form as a beam part.

This final compression of the material is effected with the aid of a first screw conveyor 28 provided with a wing, the pitch of which decreases towards the second space. This affords the advantage of enabling the material to be compressed to a predetermined extent by the screw conveyor and the conveyor pitch.

The screw conveyor and said wing is rotated in the space 3 and 3' by means of a drive means 6.

A briquette-shape, which forms a beam part A, is fed continuously through the nozzle 4 and into a matrix 10 comprising four movably arranged wall parts 11, 12, 13 and 14.

The distance between the nozzle 4 and the adjacent end part 10a of the matrix 10 is preferably kept small, for instance about 0.2 m.

It should be noted that the beam section A has a low mechanical strength and that it is necessary to work and cool said section and also to finally compress the section to some extent in the matrix 10.

The side surfaces of respective beam sections are worked in the machine nozzle 4 to predetermined measurements and it is assumed that the speed at which the beam parts are fed through the matrix 10 is at least almost equal to the speed at which the beam part A passes through the nozzle 4.

The beam part A is warm and has poor mechanical strength when located adjacent the nozzle 4 and can not therefore take-up appreciable pressure forces and is also liable to crack when subjected to small tension forces. These circumstances place high requirements on the construction of the matrix 10, such as to enable the beam to be fed continuously through the matrix with a continuous feed movement adapted to the speed at which the beam part is fed through the nozzle 4, despite the fact that reciprocatingly movable wall parts are used.

Tests carried out in practice have shown that an advantage is afforded when the beam parts are subjected to further, small compression as said parts pass through the matrix 10.

To this end, the illustrated machine is provided with two anvil devices or counter-pressure devices 20, 21 which act against the edge surfaces of the finished beam. A further two anvil devices may be provided for coaction with the upper and lower surfaces of the finished beam, so as to increase resistance.

These anvil devices, or counter-pressure surfaces, consist of a spring (not shown) which presses against the beam and with which the pressure force exerted can be adjusted such that an increasing pressure force will result in further compression of the beam parts in the matrix, as described in more detail here below.

The force exerted by the wall parts on the beam parts located in the matrix 10 can be adjusted in dependence on the application concerned.

Figure 2:
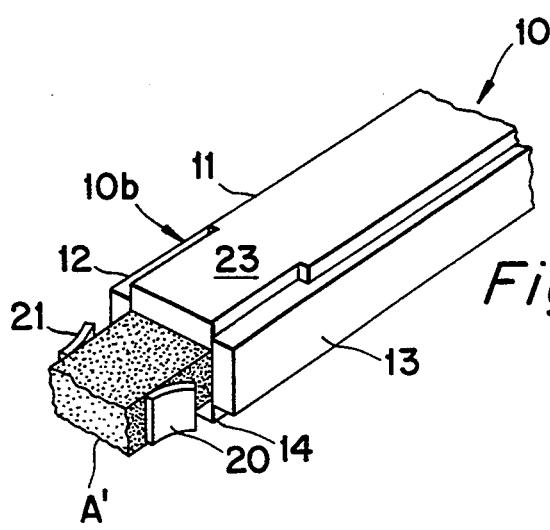
FIG. 2 is a perspective view of one end section of a matrix comprising four movably arranged wall parts.

In order to enable the friction to be adapted between the outer surfaces of the beam parts and the inner surfaces of the matrix 10 it is proposed that the matrix is divided into sections or wall parts. FIG. 2 illustrates a matrix which is divided into four wall parts 11, 12, 13 and 14 arranged to define a rectangular cross-section.

Each of these wall parts coacts with a respective hydraulic piston-cylinder device (not shown) which function to move respective wall parts backwards and forwards in the longitudinal extension of the beam. Given wall parts shall move synchronously and others asynchronously.

Respective wall parts are held in position by rollers (not shown) which extend along the whole of the matrix and which are provided in numbers sufficient to achieve the stability required.

Figure 3:
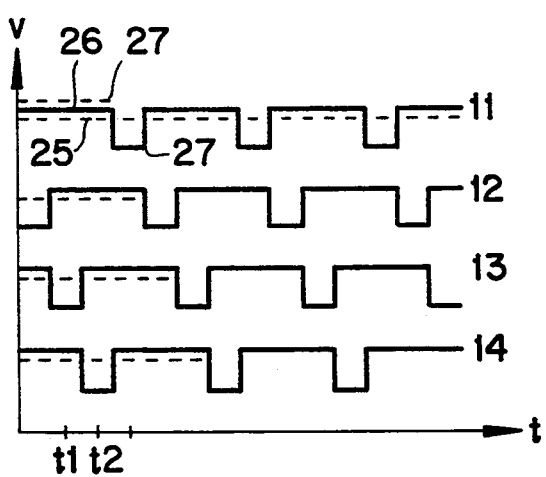
FIG. 3 is a speed-time-diagram for each of the four movable wall parts.

The piston-cylinder devices coating with respective wall parts enable said wall parts to be moved through either a short or a long distance with each working stroke of said devices, while enabling said devices to complete a full working stroke at different moments in time, as illustrated by the pattern shown in FIG. 3.

As beforementioned, there is used a mixture of wood chips or saw dust or the like admixed with a plastic material, where the saw dust or like material has been heated during the drying process and the thermal content of the saw dust used directly to achieve mixing the saw dust with plastic material. As illustrated in FIG. 1, this mixture is precompressed vertically as it passes through the tube 2 and is subjected to its main compression by means of a horizontal screw conveyor whose pitch decreases in a direction towards the nozzle 4 and the matrix 10.

The space beneath the tube 2, and also said tube, may be heated by heating coils 29.

The wall parts of the matrix may be mutually parallel, since the volume of the plastic material decreases at lower temperatures. It lies within the scope of the invention, however, to arrange the wall parts so that the beam passing through the matrix 10 will be clamped hard against the inner surface of the wall parts.

When practising the invention, it is important that the plastic material present in the machine 1 is in a tacky and/or liquid state, and consequently the material must be at a certain temperature.

The required temperature can be maintained in accordance with the invention, by using a speed-controllable screw conveyor in the machine 1.

High friction losses are obtained at high speeds and low friction losses at lower speeds.

The supply of heat can also be controlled through the temperature of the starting material and/or by supplying heat from an external source.

Since the construction of the remainder of the machine 1 is known to the art, this part of the machine will not be described here.

In the FIG. 2 embodiment, all four wall parts can be moved backwards and forwards through a distance of between 10 and 100 mm, preferably about 50 mm, with the aid of known devices (not shown).

The invention is based on the concept of enabling the beam section A and other beam sections to be transported continuously through the matrix 10 with the aid of said reciprocatingly movable wall parts, without deforming the beam section located adjacent the nozzle 4.

In order to make this possible, the wall parts are arranged to move in a particular pattern, as illustrated in FIG. 3.

During the time interval t1, the wall parts 11, 12 and 14 move synchronously and slowly from the nozzle 4 at a speed commensurate with the speed at which the beam part A leaves the nozzle 4, therewith drawing the beam through the matrix 10, whereas the wall part 13 effects a rapid return movement.

During the time interval t2, the wall parts 11, 12 and 13 move slowly while the wall part 14 returns, and so on.

It has been found that at least two wall parts, preferably three wall parts shall be moved in common and synchronously in the direction of movement of the material or beam part A during each time interval.

Alternatively, the wall part 14 or the bottom part of the matrix 10 can be replaced with a conveyor having a constant, low feed speed commensurate with the speed at which the beam part A leaves the nozzle 4.

It is desirable to effect said return movement as quickly as possible, i.e. shorter than the time duration illustrated in FIG. 3, which would then enable the four side parts to contribute in feeding the beam section A through the matrix 10 for a short interval of time.

The above description departs from the assumption that the beam parts in the matrix will accompany precisely the movement of the wall parts from the nozzle 4 and that the friction required to achieve this is generated between the inner surfaces of the wall parts and the beam parts.

In an alternative embodiment, the speed at which the beam parts are fed through the matrix 10 may be determined by the tension of the anvil devices 20, 21 or in some similar manner, such as to cause the wall parts to move at a slow speed which slightly exceeds the speed at which the beam parts are achieved.

This will result in relative movement in the feed direction calculated between the wall parts and the beam parts, wherein the outer surfaces of the beam parts are worked as a result of this relative movement.

When applying this alternative, electric coils or loops can be incorporated in the wall parts of the matrix part 10a located adjacent the nozzle 4 so as to provide a heating effect 22.

It may also be convenient to provide a cooling effect 23, by incorporating water conduits in the wall parts of the matrix part 10b located distal from the nozzle 4.

In FIG. 3, a 0-level 25 has been inserted for the speed of one wall part, for instance, the wall part 11.

The level 26 above said 0-level indicates a slow speed commensurate with the speed at which the beam part leaves the nozzle 4, this level extending over a long time period, whereas the level 27 indicates a high speed in the opposite direction over a short period of time.

The level 26' above the level 26 indicates a speed which is slightly greater than the speed at which the beam parts leave the nozzle 4 and requires effective coaction between anvil devices 20, 21 and a finished beam (A').

It will be understood that the invention is not restricted to the above described and illustrated embodiments thereof, and that modifications can be made within the scope of the inventive concept defined in the following claims.

Thus in this description and in the claims the expression "Beam" has been used. This has been done for the sake of simplicity and it is understood by each man skilled in this art that the invention generally referrs to the production of an elongated member or element, which can not only be used as a "beam" but also for other purposes.

I claim:

1. A method of producing an elongated beam from a compressible and compressed material mixture comprising a plastic material and a filling material, comprising the steps of:
   introducing said material mixture into a first space;
   compressing the introduced material in the first space;
   continuously passing the compressed material to a second space, said second space defined on all sides along a longitudinal direction by movable wall parts;
   subjecting the compressed material in said second space, in the form of a matrix, to nonintermittent continuous movement in a direction away from said first space; and
   adapting said continuous movement to the speed at which the compressed material leaves said first space.

2. A method according to claim 1, wherein a number of wall parts of said second space or matrix are moved in the direction of transportation of said material through said space.

3. A method according to claim 1, wherein at least two of the wall parts are moved in common in the transport direction of the material during each time section.

4. A method according to claim 1, wherein thermal energy is generated when compressing the mixture of filling material and plastic material in said first space and is adapted so that the mixture will be heated to a temperature sufficiently high to soften the plastic material present.

5. A method according to claim 1, wherein thermal energy is generated when compressing the mixture and is controlled by adjusting the speed of a rotatable shaft with a screw for compressing the mixture.

6. A method according to claim 1, wherein the material mixture is compressed with the aid of a screw conveyor whose pitch decreases in a direction towards said second space.

7. A method according to claim 2, wherein the wall parts form a matrix; and in that said wall parts are moved slowly forwards and rapidly backwards along the outer surfaces of the beam.

8. A method according to claim 1, wherein the plastic material is mixed with filling material in proportions such that the plastic material is present in an amount of between 20 and 60%.

9. A method according to claim 8, wherein the proportions is 40%.

10. An arrangement for producing an elongated beam, comprising:
    a compressing arrangement for compressing a mixture of plastic material and filling material in a first space and pressing the material mixture through a nozzle;
    means for passing the compressed material mixture to a second space;
    wall parts of the second space are movable reciprocatingly to an extent such as to cause the compressed material mixture to move continuously in said second space at a speed which is adapted to the speed at which said material mixture leaves said first space.

11. An arrangement according to claim 10, wherein the first space is included in a briquetting machine; and there is a free distance between a nozzle of said briquetting machine and said second space.

12. An arrangement according to claim 10, wherein the wall parts are arranged to move reciprocatingly in a direction commensurate with the direction in which the material mixture moves through said second space.

13. An arrangement according to claim 10, wherein two or three wall parts are arranged for common movement in the direction of movement of the material mixture from said first space.

14. An arrangement according to claim 10, wherein said second space is defined by a multi-section matrix which surrounds the material mixture; and in that one or more matrix sections is able to move slowly in a forward direction and rapidly in a return direction.

15. An arrangement according to claim 10, wherein a part of the matrix located adjacent the nozzle is heated, whereas a part of the nozzle located remote from the matrix is cooled.

16. An arrangement according to claim 10, further comprising a rotating shaft with a screw in said compressing arrangement.

17. An arrangement according to claim 10, further comprising an external source for supplying thermal energy to said compressing arrangement.

18. An arrangement according to claim 10, further comprising an extruder having a variable speed extruder screw in said compressing arrangement.

19. An arrangement according to claim 10, further comprising an anvil device for causing relative movement between the wall parts and said material mixture as the wall parts move slowly forward.

20. A method of producing an elongated beam comprising the steps of:
    compressing a mixture in a first space;
    pressing the mixture from the first space into a second space having a plurality of wall sections defining said second space;
    moving the mixture from the second space in a mixture moving direction by moving a plurality of said plurality of wall sections in the mixture moving direction at a first speed while moving one of said wall sections in a reverse direction at a second speed for a predetermined time period; and
    continuously repeating the moving of said wall sections, wherein for each repetition a different wall section is moved in the reverse direction until each wall section has been moved in the reverse direction.

21. A device for producing an elongated beam, comprising:
    a compressing arrangement for compressing a mixture in a first space and for pressing the mixture from the first space into a second space;
    a plurality of wall sections defining said second space;
    means for moving the mixture from the second space in a mixture moving direction, said moving means including means for moving a plurality of said plurality of wall sections in the mixture moving direction at a first speed while moving one of said wall sections in a reverse direction at a second speed for a predetermined time period, and for continuously repeating the aforementioned wall moving, wherein for each repetition a different wall section is moved in the reverse direction until each wall section has been moved in the reverse direction.

* * * * *